Patented Sept. 2, 1930

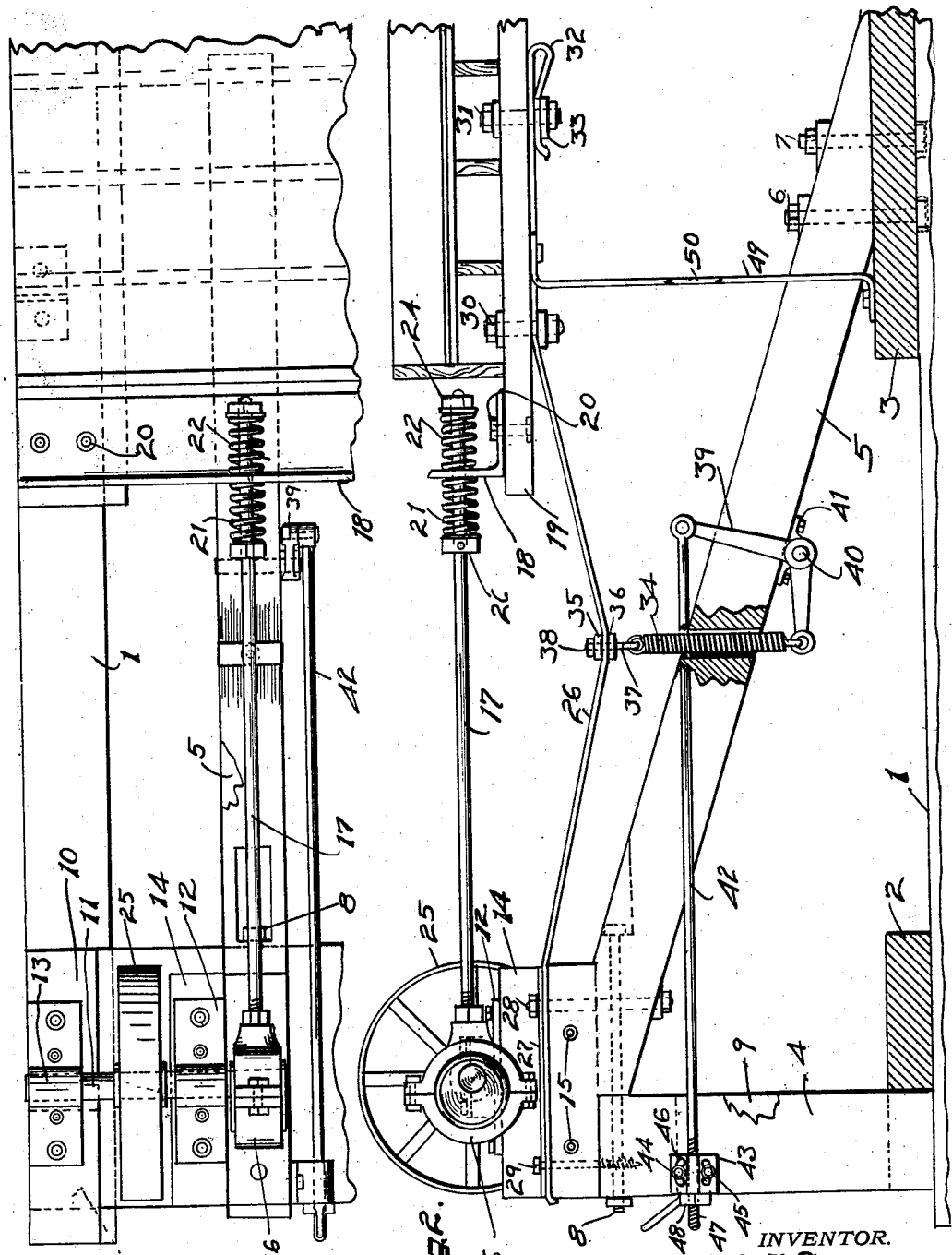

1,774,769

UNITED STATES PATENT OFFICE

LEWIS E. SPEAR, OF OAKLAND, CALIFORNIA

HEAD-MOTION FOR CONCENTRATORS

Application filed July 19, 1927, Serial No. 206,876. Renewed January 24, 1930.

This invention relates to improvements in head motion for concentrators.

It is understood by those skilled in the art that a wide range of adjustment in the means to absorb the endthrust of the rapidly reciprocating head adds greatly to the efficiency of the concentrator, and the object of the present invention is to provide means to adjust the thrust in vibrating the head as well as means to adjust the retarding device. Another object is to provide a machine of strong construction and simple in design.

Other objects of the invention will be apparent as the description proceeds.

An embodiment of the invention is shown in the accompanying drawing in which the same reference numeral is applied to the same portion throughout the several figures of the drawings and of which there may be modifications.

Figure 1 is a plan of the concentrator showing this head motion and is partly broken away.

Figure 2 is a side elevation of the concentrator shown in Figure 1.

The numeral 1 indicates the bottom timbers of which there may be two or more; 2 and 3 are cross support timbers; 4 is a vertical member which may be termed the resisting post, which is braced by the timber 5; this brace is held in place at the bottom by bolts 6 and 7 to the cross timber 3, and at the top by the bolt 8 to post 4.

The post 9 supports the member 10. A shaft 11 is mounted on the frame by means of bearings 12 and 13, the bearing 12 being supported on projecting member 14 which is bolted to the brace 5 by means of bolts 15. The bearing 13 is bolted to the member 10. Fixed to the shaft 11 is the eccentric 16 which has the rod 17, which passes through a hole in the transverse angle iron 18, which is bolted to the concentrator table head 19 by means of bolts 20.

Springs 21 and 22 on each side of the angle iron are held in adjustable tension by the fixed collar 23 and the threaded nut 24. The eccentric is driven by the pulley 25 by means of any suitable power.

Spanning the space between the head 19 and the top of brace 5 is a flexible belt or strap 26 which may be of any suitable flexible material, it may in fact be flexible wire cable, but in this instance a belt of some width is shown, which is fastened to the top of brace 5 by a plate 27 and bolts 28 and 29 and to the head by bolts 30 and 31, the end of the strap being looped back at 32 and held by the washer 33 of the bolt 31. The belt has more or less slack when the eccentric is back as shown in the drawing depending on the adjustment of the springs 21 and 22 and of the spring 34 which is attached to the belt midway its length by means of the clamps 35 and 36 and hook bolt 37 and nut 38. Tension is applied to the spring by the bell crank lever 39 to which the lower end of the spring is fastened, the bell crank lever being pivoted on the shaft 40 in the bearing 41 on the brace 5.

For convenience a rod 42 connects the bell crank to a bracket 43 on the post 4 by means of the bolts 44 and 45; slots 46 in the bracket allow a little movement thereof to allow for the movement of the bell crank.

Threads 47 and a nut 48 with a handle are provided for adjusting the spring.

Spring supports 49 and 50 support the head. These supports as well as those not shown are a well known form, and form no part of the invention.

In operation the pulley 25 is driven the required speed to cause the eccentric to vibrate the head through the rod 17 and springs 21 and 22, the nuts 24 and 48 being adjusted to give the required endthrust take up and retarding effect.

Having thus described my invention, what I desire to secure by Letters Patent of the United States is as follows, but modifications may be made in carrying out the invention as shown in the drawing and in the above particular form thereof, within the purview of the annexed claims.

1. A head motion for concentrators comprising a frame with a vibratory table, a resilient means for driving said table, a support for said driving means, and a spring tensioned flexible connection between said support and said table.

2. A head motion for concentrators comprising a frame, a vibratory table mounted on said frame, a vertical post spaced from said table on said frame, a brace member for said post, driving means having a resilient connecting means mounted on said post adapted to reciprocate said table, and an adjustable spring tensioned flexible coupling between said table and said post.

3. A head motion for concentrators comprising a frame, a vibratory concentrator table mounted on said frame, a vertical post spaced from said head on said frame, a brace for said post, a shaft mounted on said post and brace, an eccentric on said shaft, a connecting rod on said eccentric adapted to pass through a member on said head, a spring on each side of said member on said rod, a collar and a nut on said rod adapted to adjust the tension of said springs on said member, and an adjustable spring tensioned flexible connecting link between said table and said post.

4. A head motion for concentrators comprising a frame, a vibratory concentrator table on said frame, a post spaced from said table on said frame, driving means on said post adapted to reciprocate said table, a flexible belt having slack adapted to connect said post and said head, and an adjustable spring adapted to take up and retain a tension on said belt to take up the end thrust of said table.

In testimony whereof I have hereunto set my hand this 2nd day of July, A. D. 1927.

LEWIS E. SPEAR.